B. F. PRICE.
Fruit-Pickers.

No. 158,736. Patented Jan. 12, 1875.

WITNESSES:
E. Wolff
A. F. Terry

INVENTOR:
Benjamin F. Price
BY
ATTORNEYS.

UNITED STATES PATENT OFFICE.

BENJAMIN F. PRICE, OF MOUNT STERLING, ILLINOIS, ASSIGNOR TO HIMSELF AND A. A. HILL, OF SAME PLACE.

IMPROVEMENT IN FRUIT-PICKERS.

Specification forming part of Letters Patent No. 158,736, dated January 12, 1875; application filed December 12, 1874.

*To all whom it may concern:*

Figure 1:
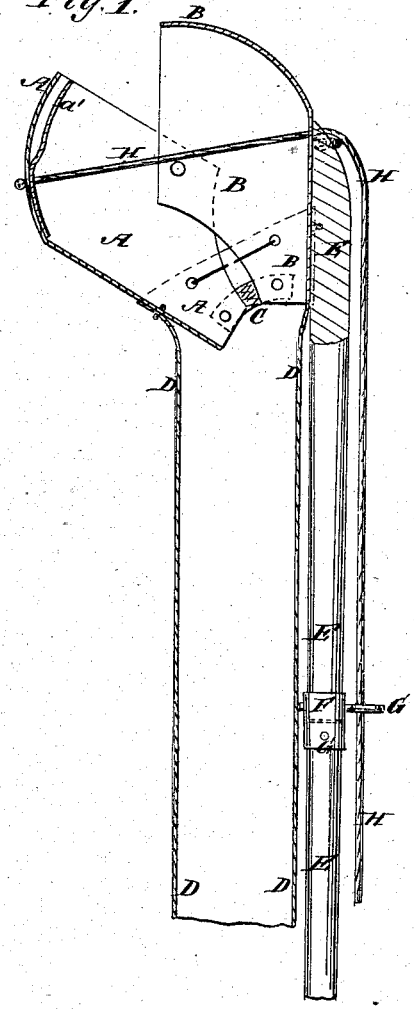
Figure 2:
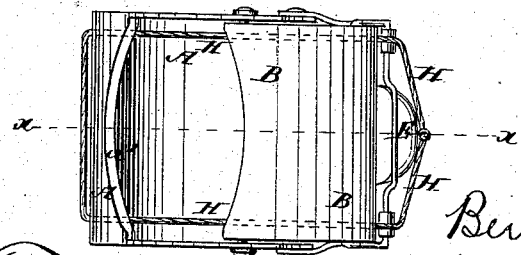

Be it known that I, BENJAMIN F. PRICE, of Mount Sterling, in the county of Brown and State of Illinois, have invented a new and useful Improvement in Fruit-Picker, of which the following is a specification:

Figure 1 is a longitudinal section of my improved fruit-picker, taken through the line $x$ $x$, Fig. 2. Fig. 2 is a top view of the same.

Similar letters of reference indicate corresponding parts.

My invention has for its object to furnish an improved machine for picking apples and other fruit from the trees, which shall be so constructed as to enable them to be picked rapidly and conveniently, and without injuring the trees or bruising the fruit, and which shall be simple in construction and inexpensive in manufacture.

The invention consists of the jaws pivoted to each other, made the one with a double concave edge and the other with a single concave edge, and provided with rubber springs, in combination with the flexible tube, the staff, and the operating-cord, as hereinafter fully described.

A B are two jaws, the sides and backs of which are straight and the tops are curved, as shown in Figs. 1 and 2. The adjacent edges of the tops of the jaws A B are made sharp and are concaved, as shown in Fig. 2, so as to tend to draw the stems of the fruit to the middle part of said edges while being cut. One of the jaws, as A, has a second edge, $a'$, parallel with and at a little distance from the main edge. The edge of the other jaw, B, passes in between the double edges of the jaw A, so that the stem of the fruit may rest against the double edge while being cut by the single edge. The jaws A B are pivoted to each other at the middle part of the adjacent edges of their sides. The lower parts of the inner edges of the sides of the jaws A B are cut away, and the lower ends of said sides are connected by rubber springs C, which hold the said jaws open, to enable them to be readily passed over the fruit. To the lower ends of the jaws A B is attached the upper end of a flexible tube, D, of cloth or other suitable material, to receive the fruit from the jaws A B and conduct it to the ground without being bruised. The back of the jaw B is attached to the upper end of a staff, E, which is designed to be made in two, three, or more sections, so that its length can be regulated according to the height of the tree from which the fruit is to be picked. The adjacent ends of the sections of the staff E are inserted in the opposite ends of short metal tubes F, where they are secured in place by pins G, the pin G that passes through the lower end of each upper section being made detachable, so that the sections can be readily taken apart and put together. H is a cord which extends along the staff E, and the upper end of which is branched, the branches passing through the upper part of the jaw B, and being attached to the upper part of the other jaw, A, so that the jaws A B can be drawn together to cut the stems of the fruit by pulling upon the said cord H. The jaw B, where the branches of the cord H pass through, should be provided with pulleys, to prevent the cord from being worn or cut, and to cause it to work easier.

Having thus described my invention, I claim as new, and desire to secure by Letters Patent—

The jaws A B, pivoted to each other, made the one with a double concave edge and the other with a single concave edge, and provided with rubber springs C, in combination with the flexible tube D, the staff E, and cord H, substantially as herein shown and described.

B. F. PRICE.

Witnesses:
 WILLIAM LEE,
 D. W. ROBINSON.